Sept. 13, 1960  D. P. BRESEE  2,952,531
APPARATUS AND METHOD FOR PRODUCING LIQUID FERTILIZER
Filed Nov. 13, 1956  2 Sheets-Sheet 1

INVENTOR.
D. P. BRESEE
BY Hudson & Young
ATTORNEYS

Sept. 13, 1960  D. P. BRESEE  2,952,531
APPARATUS AND METHOD FOR PRODUCING LIQUID FERTILIZER
Filed Nov. 13, 1956  2 Sheets-Sheet 2

INVENTOR.
D. P. BRESEE

BY

ATTORNEYS

United States Patent Office 2,952,531
Patented Sept. 13, 1960

2,952,531

APPARATUS AND METHOD FOR PRODUCING LIQUID FERTILIZER

Dick P. Bresee, St. Louis, Mo., assignor to Phillips Petroleum Company, a corporation of Delaware Filed Nov. 13, 1956, Ser. No. 621,725

13 Claims. (Cl. 71—41)

This invention relates to apparatus and a method for the production of liquid fertilizer. In one aspect it relates to an apparatus and a method for reacting one liquid reactant with water whereby the reaction mixture becomes heated, and cooling the mixture sufficiently to avoid excessive loss by evaporation of volatile constituents. In another aspect it relates to an apparatus and a method for reacting one liquid reactant with at least one other liquid reactant with the evolution of heat of reaction for the production of liquid fertilizers whereby the reaction products become heated, and for cooling the reaction mixture. In another aspect it relates to apparatus and a method for producing a cooled aqueous ammonia, and aqueous ammonium phosphate fertilizer from anhydrous ammonia and water, and from phosphoric acid, anhydrous ammonia and water.

My invention has special application in the liquid fertilizer field in which liquid (anhydrous) ammonia is mixed with water to produce aqueous ammonia and in the production of aqueous ammonium phosphate by the addition of phosphoric acid and ammonia to water. In the production of both aqueous ammonia and aqueous ammonium phosphate, considerable quantities of heat are evolved and in aqueous solutions containing free ammonia temperatures should be maintained as low as possible to avoid loss of ammonia. The production of aqueous ammonia from water and anhydrous ammonia and aqueous ammonium phosphate from water, anhydrous ammonia, and phosphoric acid, in large commerical plants exhibits few cooling problems because an ample supply of cooling water and refrigeration is ordinarily available. However, in case a dealer wishes to stock anhydrous ammonia, or anhydrous ammonia and phosphoric acid separately and then produce aqueous ammonia or aqueous ammonium phosphate as needed, the problem of refrigerating or cooling the produced aqueous ammonia and the aqueous ammonium phosphate is a real one. Ordinarily under these latter conditions plant type refrigeration is not available, nor is the capital investment to construct it warranted.

According to my invention, I have devised an apparatus which is relatively inexpensive to construct and simple to operate to produce such products sufficiently cooled for storage and handling without undue vaporization loss.

An object of my invention is to provide an apparatus in which to produce liquid fertilizer products, which become heated by exothermic reaction during production, sufficiently cool for storage and handling.

Another object of my invention is to produce aqueous ammonia and aqueous ammonium phosphate from water and ammonia, and water, ammonia and phosphoric acid.

Still another object of my invention is to provide such an apparatus which requires only low capital investment for construction and requires low maintenance costs.

Yet another object of my invention is to provide a process for producing such liquid fertilizers in a sufficiently cool condition for storage and handling without undue vaporization loss.

Yet another object of my invention is to provide apparatus and a method for producing aqueous ammonia from anhydrous ammonia and water, and aqueous ammonium phosphate from anhydrous ammonia, phosphoric acid and water, and in some cases the ammonium phosphate containing an excess of free ammonia over that required to produce tri-ammonium phosphate, and to cool these aqueous solutions to such temperature as to minimize evaporation of free ammonia during subsequent storage and handling.

Still other objects and advantages of my invention will be realized upon reading the following description which, taken with the attached drawing, forms a part of this specification.

In the drawing

Figure 1:
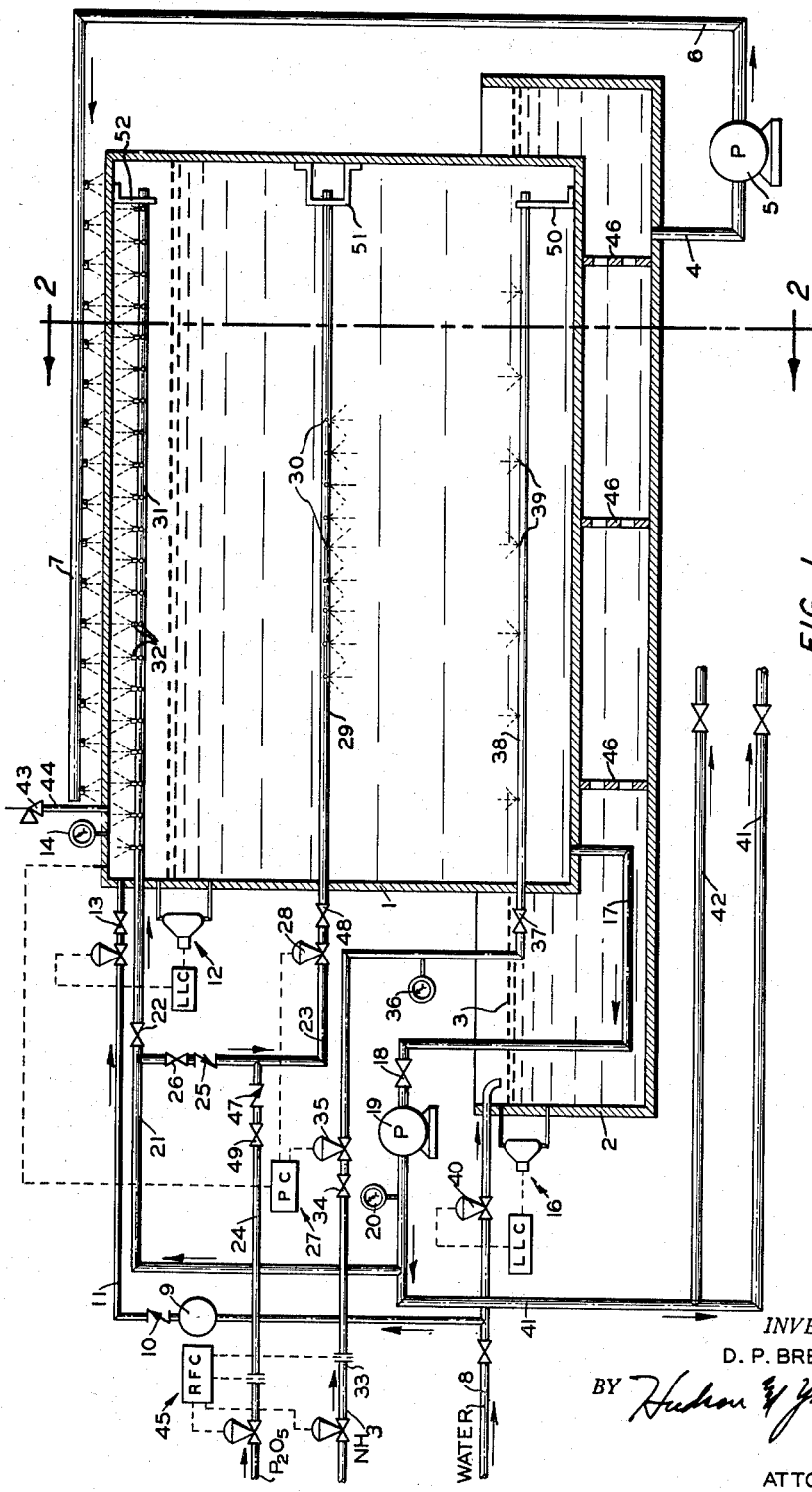
Figure 1 illustrates a sectional elevational view of one embodiment of apparatus parts suitable for carrying out the process of my invention.

Aqueous ammonia fertilizer is produced according to my invention with any desired concentration of ammonia. In some agricultural areas aqueous ammonia is injected into the soil by movable apparatus resembling cultivators equipped with tubular means for injecting the aqueous ammonia below the surface of the ground. In areas which are irrigated, it is convenient to add the aqueous ammonia to the irrigation water for application to the soil. According to my invention, I produce aqueous ammonia from anhydrous ammonia in any desired and suitable concentration for application to the soil. Similarly, I also produce aqueous ammonium phosphate with or without an excess of ammonia over that required to produce triammonium phosphate for application to the soil by mechanical device or by irrigation water.

Broadly, my liquid fertilizer converter cooling system comprises, in combination, a closed tank, a first conduit for admitting water to said tank, a first spray pipe disposed in the upper and normally vapor containing space of said tank, a second conduit for passage of liquid from the lower portion of said tank to said first spray pipe, a second spray pipe disposed in the lower and normally liquid containing portion of said tank, a source of ammonia communicating with said second spray pipe and means for spraying the exterior wall of said tank with cooling water. In some cases I employ in this converter and cooler a third spray pipe disposed in the normally liquid containing space of the tank and a source of phosphoric acid communicating with the third spray pipe.

Furthermore, my process for producing cooled aqueous fertilizer from reactants which when mixed evolve heat, comprises introducing a reactant into an aqueous medium in a mixing zone, withdrawing aqueous medium from the lower portion of said zone and spraying same on the inner surface of the upper walls of said zone, flowing cooling water on the outer surface of said zone whereby the aqueous contents of said tank are cooled.

The terms $P_2O_5$ and phosphoric acid are used synonymously throughout the specification and claims.

The drawing illustrates one embodiment of apparatus parts suitable for carrying out the process of my invention.

Referring now to Figure 1 of the drawing, reference numeral 1 identifies a closed tank which is suitable for use in carrying out the process of my invention. As illustrated in the figure, this tank is disposed with its longitudinal axis horizontally. I find that positioning this tank in this manner that all portions and apparatus parts are closer to the ground and do not necessitate construction of expensive ladders and walkways. Tank 1 is disposed in an open top tank 2 in such a manner that preferably at least a small portion of a closed tank 1 is immersed in a body of water maintained in the open tank 2 for cooling purposes. A pipe 4 is provided for passage of cooling water 3 from tank 2 under the influence of a pump 5 through a pipe 6 and a spray pipe 7. This spray pipe 7 spreads cooling water over the upper surface of tank 1. A pipe 8 is connected with the source of the water, not shown, for passage of water to the open tank 2. A branch pipe 11 is provided for passage of water from pipe 8 to the upper portion of the tank 1. This branch pipe 11 is provided with a meter 9 for measuring the flow of water. The pipe is also provided with a check valve 10 which allows passage of water only in the direction from pipe 8 to tank 1. A liquid level float control assembly 12 is provided to control or regulate the flow of water into tank 1 in response to the level of liquid in the tank. This liquid level control assembly is intended merely to maintain a constant or substantially constant level of liquid within the tank. A manually operable valve 13 is provided in conduit 11 in case maintenance needs to be carried out on the water meter 9, check valve 10 or the motor valve in conjunction with the liquid level controller 12. A pressure gauge 14 is provided for indication of pressure within the tank.

A liquid level controller apparatus 16 operates a motor valve 40 to regulate the flow of water from pipe 8 into tank 2 to maintain a predetermined or constant level of water therein.

A pipe 17 provided with a manually operable valve 18 communicates with lower portion of tank 1 for passage of liquid therefrom through a pump 19 and pipe 21 for returning to the tank. The liquid returned to the tank 1 is injected thereinto through a pipe 31 provided with orifices or spray nozzles 32. These nozzles or orifices 32 are positioned in the upper side of the pipe 31 and in the sides thereof in such a manner that the aqueous solution is impinged against the walls of the tank in the portion of the tank normally containing vapor. Pipe 21 is provided with a pressure gauge 20 for indication of pressure near the outlet of pump 19.

A branch pipe 23 communicates with pipe 21 and with a spray pipe 29 disposed within tank 1 at a more or less centrally located position as illustrated in the drawing. Spray pipe 29 is provided with orifices or nozzles 30 which are intended to permit passage of liquid in jet form for rapid mixing of the material issuing from the orifices with the liquid in the tank. A definite number of orifices or nozzles having a specific size are employed. The injection pressure of the liquid in pipe 29 is such that liquid emerging from orifices 30 will be rapidly dissolved by the liquid in the tank in such a manner that heat of solution is rapidly dissipated so that vibration will not occur. It is necessary that the orifices 30 be of relatively small diameter and only sufficient in number that the liquid injected therethrough will enter the medium in the tank at a high velocity. In case phosphoric acid is the material introduced into the tank through spray pipe 29, a pipe 24 conducts the phosphoric acid from a source, not shown, to pipe 29. Pipe 24 is provided with a check valve 47 at a point reasonably close to pipe 23 so that acid or preferably water from within tank 1 cannot flow backwards into pipe 24. Also, a check valve 25 is provided in pipe 23 so that phosphoric acid from pipe 24 cannot flow backwards into pipe 21. A manually operable valve 26 is also provided in pipe 23 for closing this pipe from pipe 21 in case liquid from pipe 21 is not desired to be passed into pipe 23.

Another spray pipe 38 is disposed in lower portion of tank 1 as illustrated. This spray pipe 38 is provided with orifices or nozzles 39 as indicated. This spray pipe is connected with a pipe 33 and this latter pipe is intended to conduct anhydrous ammonia from a source, not shown, to the spray pipe 38.

Pipe 33 is provided with manually operable valves 34 and 37 and a manually operable valve 48 is provided as a connection between pipe 29 and pipe 23 just outside the tank. A motor valve 35 is positioned in pipe 33 between valves 34 and 37, and a motor valve 28 is positioned in pipe 23 as shown. The motor valves 35 and 28 are a portion of a pressure controller assembly 27. A pressure gauge 36 is provided in pipe 33 at the position indicated in order to register pressure of the anhydrous ammonia entering this system. This pressure gauge is provided because anhydrous ammonia is, of course, always maintained under pressure.

Pipes 41 and 42 are provided for outlet of a finished product of my process to a truck-loading dock, and to a tank car loading dock, or to storage.

Pressure relief valve 43 is provided in pipe 44 in case pressure relief from the tank 1 becomes necessary.

The pressure regulator assembly 27 is also intended as a safety measure in case pressure within tank 1 becomes too high. This assembly is intended to operate as follows, in case pressure in tank 1 reaches a predetermined maximum pressure this assembly operates to close motor valves 28 and 35 to prevent flow of phosphoric acid and anhydrous ammonia, respectively, into the tank 1.

In order to produce, for example, triammonium phosphate, by reaction of the anhydrous ammonia and phosphoric acid in water, it is necessary, of course, to proportion properly these two ingredients. A ratio flow controller apparatus 45 is provided for controlling the ratio of the rates of flow of phosphoric acid in pipe 24 and of anhydrous ammonia in pipe 33. Such a ratio flow controller is standard equipment and can be purchased at instrument supply houses. Such apparatus operates broadly in the following manner. Upon setting the rate of flow of a liquid in a first pipe at a predetermined rate, then the ratio flow controller regulates the rate of flow of liquid in a second pipe, in response to the rate of flow of liquid in the first pipe at the set ratio. This ratio flow controller can, of course, be set to produce diammonium phosphate, or triammonium phosphate as desired, or even an excess of ammonia can be admitted to tank 1 over that required to produce the triammonium phosphate. The use of an excess ammonia over that required to produce triammonium phosphate is for several reasons, one being that it provides additional nitrogen for fertilizer over that contained in triammonium phosphate and furthermore, it makes certain that the contents of tank 1 are alkaline rather than acid for the elimination of corrosive conditions within the tank. I prefer that spray pipe 29 be made of stainless steel or of any other suitable corrosion resistant material because there is passed through this pipe an aqueous solution containing excess of phosphoric acid, and, of course, phosphoric acid being a fairly strong acid has a marked tendency to corrode ordinary ferrous materials.

The particular positioning of spray pipe 29 illustrated in the drawing is such that the pipe is disposed in substantially the center of the tank so that the solution being injected through orifices 30 can be completely neutralized regarding the phosphoric acid content before the injected phosphate has an opportunity to contact the walls of the tank. From this consideration, I prefer to employ at least a slight excess of ammonia in the aqueous contents of the tank. In this manner the only liquid actually in contact with the metal walls of the tank is always an alkaline solution.

Supports 46 are provided as shown for supporting the closed tank 1 within the open tank 2.

Numerous advantages of my apparatus are obvious from close scrutiny of the drawing as illustrated. A pressure relief valve 43 is provided in case excessive pressure beyond that for which the tank was constructed occurs within the tank.

Another safety feature is the pressure operated regulator assembly 27 which is intended to close off the inlet of phosphoric acid at valve 28 and anhydrous ammonia at valve 35 in case the pressure within the tank reaches an undesired and predetermined high pressure.

Another advantage of my invention is the provision of the particular spray pipes 29 and 38, which are sometimes called sparge tubes. These tubes are so designed as regards diameter of spray openings 30 and 39 so that the liquids being injected therethrough are injected at a high velocity to dissipate heat rapidly and thereby eliminate vibration of the apparatus. I find that vibration is eliminated or substantially eliminated mainly by providing a number of small openings spaced along a pipe. By so providing and spacing these injection openings, only small streams of liquid at high velocity enter the aqueous solution in the tank with the result that heat of solution and of reaction is rapidly dissipated and vibration because of the production of large amounts of heat locally is avoided. Obviously, the tank ends of sparge tubes 29 and 38 are closed so that all of the liquid injected through these tubes will be forced through the orifice or nozzles 30 and 39.

Another advantage of my invention is that a separate chemical mixing vessel is not required because all of the mixing of the chemicals, that is the ammonia and phosphoric acid with water takes place in the presence of a large volume of aqueous solution in the main storage and cooling tank.

In one example of my fertilizer production system anhydrous ammonia was ejected through an opening made by a No. 52 twist drill at pressure of about 170 pounds per square inch gage (p.s.i.g.) into a tank containing 701 gallons (5,850 pounds) of water. Substantially no vibration occurred under these hole size and pressure conditions. The ammonia fanned out in the form of a cone, with the apex pointing toward the drill hole or orifice through which the ammonia was being forced. The cone extended for about 18 inches from the orifice.

Anhydrous ammonia was ejected from three No. 52 drill holes at the stated pressure for 203 minutes. During this time 1,331 pounds of anhydrous ammonia passed through the No. 52 drill holes, representing a feed rate of about ½ gallon per minute per hole. During a portion of this run it was believed one of the drill holes was plugged or partially plugged. During this run gage pressure on the aqueous ammonia tank increased from 0 to 18 pounds. At the end of the injection of the ammonia the tank was sprayed with water at substantially atmospheric pressure for 9 minutes for cooling the tank contents. Because of this cooling the pressure was reduced from 18 to 15½ p.s.i.g. which drop in pressure indicated effectiveness of a water spray on the exterior surface of the tank as a cooling means.

For a large commercial installation I recommend use of one anhydrous ammonia injection or sparge tube about 9 feet long and containing 7 No. 52 drill holes as injection orifices. These drill holes are spaced about 1 foot apart, with one hole being about 1 foot from the inner end of the tube. The sparge tube is positioned horizontally in the tank about one foot off the bottom with the drill holes pointing upward so that the ammonia will be directed upward. A brace or support 50 (see drawing) is provided for supporting the inner end of the ammonia sparge tube, illustrated as tube 38. A tube so constructed and positioned in a tank of water, will upon injection of anhydrous ammonia under the above mentioned pressure and flow rate conditions cause a rolling motion to the liquid, that is, liquid will rise upward in a vertical plane which includes the ammonia sparge tube, then will flow outward toward the walls of the tank, then downward to the bottom and inward toward the sparge tube to complete its cycle of flow.

The sparge tube 29 for injection of phosphoric acid, when ammonium phosphate is to be produced, is about the same length as tube 38, and is supported at one end by a support 51. The feed end of both sparge tubes are obviously supported by the tank walls. Holes or orifices for phosphoric acid injection are made with about No. 50 twist drills, a separate hole being about 3 feet from each end of the acid sparge tube so that there will be ammonia injected between the small stream or cone of acid and the walls of the tank to prevent possible acid corrosion. About seven additional holes are drilled equally spaced between the two mentioned holes, all point generally downward, but alternate holes to one side or the other, so that the injected acid will have ample opportunity to be neutralized with the ammonia to eliminate all possible chance of acid corrosion of the inner tank walls, and other metal surfaces with which the solution comes in contact. Since pipes 24 and 23 are acid resistant, I show a portion of the circulated stream of diluted ammonia being injected from pipe 21 via valve 26 and check valve 25 into pipe 23 to neutralize at least a portion of the acid prior to its introduction into the tank. The heat effect upon addition of the acid is considerably less than the heat of dilution of anhydrous ammonia; thus the number and size of orifices in sparge tube 29 are not as critical as are those in the ammonia injection tube 38.

In preparation of aqueous ammonium phosphate, it is preferable to prepare first an aqueous ammonia solution with a portion of the anhydrous ammonia and then begin injection of the phosphoric acid to avoid all possible chance of acid corrosion.

For preparing triammonium phosphate there is required about 1.01 volumes of commercial 85% phosphoric acid per 1 volume of anhydrous ammonia.

Figure 2:
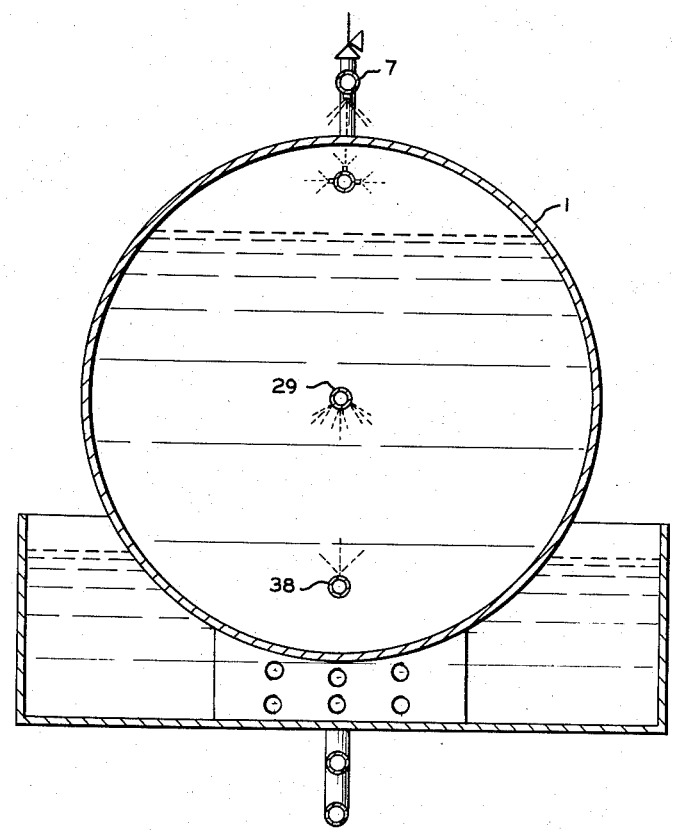
Figure 2 is a sectional view taken on the line 2—2 of Figure 1.

Figure 2 is a sectional view taken along the line 2—2 of Figure 1 looking toward the adjacent end of tank 1. Sparge tube 38 is supported by support 50, the acid tube 29 by support 51 and the water tube 31 by support 52. Tube 38 is illustrated as being about one foot off the tank bottom, tube 29 is about midway to the top and tube 31 is about 1 foot from the high point of the tank. The directional arrows in Figure 2 illustrate the coning or fanning out of the injected ammonia and acid.

In a 24-hour per day operation employing a 10,000 gallon vertical tank, 10 ft. in diam. by 18 ft. high (Figure 1 illustrates a horizontally disposed tank), with an atmospheric temperature of 80° F. and a tank solution temperature of about 100° F., about 25 B.t.u. per degree F. per hour per square foot of tank surface are removed by heat exchange with cooling water at 80° F. sprayed on the outer tank surface. There is about 325 B.t.u. of heat evolved upon addition of one pound of anhydrous ammonia to water. The pressure of the aqueous ammonia of 25% concentration by weight at 100° F. is about 0.5 p.s.i.g. The mentioned 25 B.t.u. per degree F. per hour per square foot of tank surface represents a conversion rate of about 3.3 gallons of anhydrous ammonia per minute. The above-mentioned tank has a surface area of about 644 sq. feet exposed to the action of cooking water.

The apparatus and method of my invention are applicable for other uses than that specifically disclosed herein, for example, it is used for the production of ammonium nitrate from anhydrous ammonia and nitric acid, with or without an excess of ammonia.

When aqueous ammonia only is to be produced in a given installation, spray or sparge pipe 29 need not be installed in the tank. In this case, it is customary to place the anhydrous ammonia sparge pipe higher in the tank than illustrated in the drawing.

While I have described automatic control equipment for operating the herein disclosed system, it is within the scope of my invention to add all of the anhydrous ammonia to the water in the tank while circulating the aqueous ammonia through the spray tube 31 for cooling, then subsequently adding a predetermined amount of phosphoric acid through the same sparge tube in case aqueous ammonium phosphate is desired. Such an operation can be controlled manually as well as automatically.

While certain embodiments of the invention have been described for illustrative purposes, the invention obviously is not limited thereto.

I claim:

1. A liquid fertilizer converter and cooling system comprising, in combination, a closed tank, a first conduit for admitting water to said tank, a first spray pipe disposed in the upper and normally vapor containing space of said tank, a second conduit for passage of liquid from the lower portion of said tank to said first spray pipe, a second spray pipe disposed in the lower and normally liquid containing portion of said tank, a third spray pipe disposed in the normally liquid containing portion of said tank, a source of phosphoric acid communicating with said third spray pipe, a source of liquid ammonia communicating with said second spray pipe, a first motor valve disposed operatively in said first conduit, a liquid level controller assembly communicating with said first valve to maintain a constant level of liquid in said tank, a second motor valve disposed operatively in communication with said second spray pipe, a third motor valve disposed operatively in communication with said third spray pipe, a controller assembly for operating said second and third valves in response to pressure within said tank and means for spraying cooling water on the outer surface of said closed tank.

2. In the system of claim 1, a ratio flow controller assembly disposed in communication with said second and third spray pipes to control the ratio of flow of liquids to said spray pipes.

3. In the system of claim 1, an open top reservoir, said closed tank being disposed at least in part within said open top reservoir in such a manner as to be at least partially immersed in water disposed in said open top reservoir, said means for spraying water on the outer surface of said closed tank comprising a fourth spray pipe, and a third conduit for passage of water from said open top reservoir to said fourth spray pipe.

4. A process for producing cooled aqueous fertilizer from liquid fertilizer reactants which when mixed evolve heat comprising, separately jetting a pair of said reactants into an aqueous medium in a conversion zone whereby heat is evolved and the aqueous medium acquires a temperature higher than that of the first mentioned aqueous medium, said jetting being at a sufficiently high velocity to dissipate heat of reaction and thereby to avoid vibration, spraying the aqueous medium of higher temperature against the inner upper wall of said zone, flowing cooling water down the outer wall of said zone in indirect heat exchange relation with the aqueous medium of increased temperature within said zone, and passing a portion of the heat exchanged aqueous medium to the upper portion of said zone as the aqueous medium sprayed against the inner upper wall of said zone.

5. A process for producing cooled aqueous fertilizer from a liquid fertilizer material which when mixed with water evolves heat comprising jetting said fertilizer material into an aqueous medium in a mixing zone, said jetting being at a sufficiently high velocity to dissipate heat of reaction and thereby to avoid vibration, withdrawing aqueous medium containing said material from the lower portion of said zone and spraying same on the inner surface of the upper wall of said zone, flowing cooling water on the outer surface of said zone whereby the aqueous contents of said zone are cooled.

6. A process for producing cooled aqueous fertilizer from liquid fertilizer materials which when mixed evolve heat comprising jetting a pair of said materials into an aqueous medium in a mixing zone whereby said aqueous medium becomes heated, said jetting being at a sufficiently high velocity to dissipate heat of reaction and thereby to avoid vibration, withdrawing aqueous medium from the lower portion of said zone and spraying same on the inner surface of the upper wall of said zone, flowing cooling water on the outer surface of said zone whereby the aqueous contents of said zone are cooled.

7. In the process of claim 6 wherein said pair of materials are liquid ammonia and phosphoric acid.

8. A process for producing cooled aqueous fertilizer ammonium phosphate from water, liquid ammonia and phosphoric acid comprising withdrawing aqueous ammonium phosphate from a mixing zone, spraying the withdrawn aqueous ammonium phosphate on the inner wall surface of the upper and normally vapor containing portion of said zone, introducing water, jetting phosphoric acid and liquid ammonia separately and simultaneously into said zone whereby the aqueous contents of said zone become heated, said jetting being at a sufficiently high velocity to dissipate heat of reaction and thereby to avoid vibration, flowing cooling water on the outer surface of said zone in heat exchange relation with the heated aqueous contents of said zone whereby the latter are cooled and withdrawing cooled aqueous ammonium phosphate as the product of the operation.

9. A process for producing cooled aqueous fertilizer ammonium phosphate from water, liquid ammonia and phosphoric acid comprising withdrawing aqueous ammonium phosphate from a mixing zone, dividing the withdrawn aqueous ammonium phosphate into two portions, spraying one portion on the inner wall surface of the upper and normally vapor containing portion of said zone, mixing phosphoric acid with the other portion and jetting the mixture into the aqueous ammonium phosphate in said zone, introducing water into said zone, jetting an excess of ammonia over that required to form ammonium phosphate with the phosphoric acid into the aqueous ammonium phosphate in said zone, the jetting of said mixture, and of said excess of ammonia into said aqueous ammonium phosphate being at sufficiently high velocities to dissipate heat of reaction and thereby to avoid vibration, flowing cooling water on the outer surface of said zone in heat exchange relation with the aqueous ammonium phosphate of said zone whereby the latter aqueous ammonium phosphate is cooled, and withdrawing cooled aqueous ammonium phosphate containing said excess of ammonia as the product of the operation.

10. In the system of claim 1 wherein said second and third spray pipes comprise separate pipes provided with perforations, said perforations being adapted to spray liquid at high velocity into a liquid medium at appropriate pressure of the liquid to be sprayed.

11. In the process of claim 9 jetting the mixture of phosphoric acid and the other portion of the withdrawn aqueous ammonium phosphate into a mid portion of said aqueous ammonium phosphate in said zone thereby reacting the phosphoric acid with the ammonia and thereby avoiding acid corrosion of the metal walls of said zone, this latter jetting also being at a sufficiently high velocity to dissipate heat of reaction and thereby to avoid vibration.

12. In the system of claim 1, a pressure relief valve in communication with the upper and normally vapor containing space of said tank for regulation of pressure therein.

13. The process of claim 5 wherein said fertilizer material is liquid ammonia.

References Cited in the file of this patent

UNITED STATES PATENTS

| | | |
|---|---|---|
| 1,817,232 | Buhrig | Aug. 4, 1931 |
| 1,832,179 | Boggiano-Pico | Nov. 17, 1931 |
| 2,037,706 | Curtis | Apr. 21, 1936 |
| 2,047,393 | Siems | July 14, 1936 |
| 2,121,208 | Milligan | June 21, 1938 |
| 2,172,420 | Tweed | Sept. 12, 1939 |
| 2,242,429 | Johnson | May 20, 1941 |
| 2,384,258 | Oberfell | Sept. 4, 1945 |
| 2,450,095 | Seebold | Sept. 28, 1948 |
| 2,453,837 | Fisher et al. | Nov. 16, 1948 |
| 2,799,569 | Wordie et al. | July 16, 1957 |